US008571566B2

(12) United States Patent
Li et al.

(10) Patent No.: US 8,571,566 B2
(45) Date of Patent: Oct. 29, 2013

(54) METHODS AND APPARATUS FOR DETERMINING AND ASSIGNING SPECTRUM FOR WIRELESS COMMUNICATIONS

(75) Inventors: Junyi Li, Chester, NJ (US); Saurabh Tavildar, Jersey City, NJ (US); Aleksandar Jovicic, Jersey City, NJ (US); Hongseok Kim, Chatham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 12/756,660

(22) Filed: Apr. 8, 2010

(65) Prior Publication Data

US 2011/0250916 A1 Oct. 13, 2011

(51) Int. Cl.
*H04W 72/00* (2009.01)
(52) U.S. Cl.
USPC .................. 455/452.1; 455/450; 455/509
(58) Field of Classification Search
USPC ...................... 455/450–452.2, 509
See application file for complete search history.

(56) References Cited

U.S. PATENT DOCUMENTS

| | | | |
|---|---|---|---|
| 8,036,240 B2* | 10/2011 | Hassan | 370/419 |
| 8,055,295 B1* | 11/2011 | Khanka et al. | 455/552.1 |
| 2006/0083205 A1* | 4/2006 | Buddhikot et al. | 370/338 |
| 2008/0039105 A1 | 2/2008 | Buchwald et al. | |
| 2008/0225789 A1* | 9/2008 | Kim et al. | 370/329 |
| 2011/0205941 A1* | 8/2011 | Stanforth | 370/280 |
| 2012/0087279 A1* | 4/2012 | Rinne et al. | 370/254 |

FOREIGN PATENT DOCUMENTS

WO WO2006016330 A1 2/2006

OTHER PUBLICATIONS

Federal Communication Commision (FCC 08-260), Second Report and Order and Memorandum Opinion and Order, Awdopted Nov. 4, 2008 and Releases Nov. 14, 2008, Washington D.C., 130 Pages.
Federal Communication Commision, Proposal by Google Inc., to provide a TV Band Device Database Management Solution, Jan. 4, 2010, Washington D.C., 18 pages.
Debroy, S., et al., "Intra-Cell Channel Allocation Scheme in IEEE 802.22 Networks", Consumer Communications and Networking Conference (CCNC), 2010 7TH IEEE, Piscataway, NJ, USA, Jan. 9, 2010, pp. 1-6, XP031642963, ISBN: 978-1-4244-5175-3.
International Search Report and Written Opinion—PCT/US2011/031842—ISA/EPO—Jan. 23, 2012.

(Continued)

*Primary Examiner* — Raymond Dean
(74) *Attorney, Agent, or Firm* — Joseph B. Agusta

(57) ABSTRACT

Methods and apparatus for determining band availability and/or allocating one or more frequency bands to a communications device for wireless communications are described. In different locations and/or at different times different frequency bands, e.g., band corresponding to unused TV channels, may be available for allocation. Various described methods and apparatus are well suited for supporting local peer to peer networks in an environment in which a plurality of different technologies are supported. A centralized control device determines and allocates a frequency band to a wireless terminal for use at a given location and at a given time, e.g., for peer to peer communications using a particular technology supported by the wireless terminal. The centralized control device uses database information and information received from a plurality of wireless terminals in making frequency band allocation decisions, performing load balancing, and/or performing interference management.

33 Claims, 11 Drawing Sheets

(56) References Cited

OTHER PUBLICATIONS

Nekovee, M., "A survey of cognitive radio access to TV White Spaces", International Conference on Ultra Modern Telecommunications & Workshops (ICUMT), 2009, IEEE, Piscataway, NJ, USA, Oct. 12, 2009, pp. 1-8, XP031574187, ISBN: 978-1-4244-3942-3.

Stevenson C, et al., "IEEE 802.22: The first cognitive radio wireless regional area network standard", IEEE Communications Magazine, IEEE Service Center, Piscataway, US, vol. 47, No. 1, Jan. 1, 2009, pp. 130-138, XP011280623, ISSN:.

* cited by examiner

METHODS AND APPARATUS FOR DETERMINING AND ASSIGNING SPECTRUM FOR WIRELESS COMMUNICATIONS

FIELD

Various embodiments relate to wireless communications, and more particularly, to methods and apparatus which facilitate determination and/or allocation of one or more frequency bands, e.g., unused frequency band corresponding to television (TV) spectrum, to communications devices for wireless communications.

BACKGROUND

Recently, the FCC has indicated that unused spectrum, e.g., unused TV spectrum, may be used by communications devices for wireless communications in accordance with rules for accessing the spectrum. These rules are designed to avoid interference to the primary users, e.g., TV service Broadcasters. However, the FCC has not mandated any particular technology that should be used. This can potentially lead to situations where devices which support various different technologies may coexist and attempt to access the same white space. Managing interference across technologies can be difficult in an environment where different technologies may attempt to use the same spectrum and operations are not coordinated between the different technologies. Moreover, since there are potentially multiple frequency bands corresponding to the white space available for communication, efficient use of multiple bands across various technologies as well as for a given technology can be challenging.

In view of the above discussion, it should be appreciated that there is a need for methods and/or apparatus which would facilitate determination and/or assignment of one or more frequency bands corresponding to unused spectrum to a communications device for wireless communications.

SUMMARY

Methods and apparatus for determining and/or allocating one or more frequency bands, e.g., corresponding to unused TV channels, to a communications device for wireless communications, are described. In different locations and/or at different times different frequency bands may be available for allocation. For example, spectrum that may be licensed to a TV service provider may be available for use by local peer to peer networks when the service provider decides not to transmit at a particular time or in a particular area. As another example, some spectrum in some regions may be currently unlicensed and available for use for peer to peer networks. Various described methods and apparatus are well suited for supporting local peer to peer networks in an environment in which a plurality of different technologies are supported. The allocation of one or more frequency bands may be based on a number of factors.

In accordance with one aspect of some embodiments, an exemplary method includes a centralized control device determining and allocating a frequency band to a communications device for use at a given location and at a given time, e.g., for peer to peer communications using a particular technology. An exemplary method of allocating a frequency band for wireless communication, in accordance with some embodiments, comprises: receiving input including information indicating a location of a wireless terminal, accessing information from a database including channel usage information on a per frequency band and location basis; and assigning one of said one or more available frequency bands to said wireless terminal based on said accessed database information. In some embodiments, at least some of the available frequency bands correspond to unused television channels.

In some embodiments, a control device includes at least one processor configured to: receive input including information indicating a location of a wireless terminal; access information from a database including channel usage information on a per frequency band and location basis; and assign one of said one or more available frequency bands to said wireless terminal based on said accessed database information. The control device may, and in some embodiments does, include a memory coupled to said at least one processor.

An exemplary method of operating a communications device, e.g., a wireless terminal, in accordance with some embodiments, comprises: determining the location of the wireless terminal; communicating information indicating the location of a wireless terminal to a control device; and receiving information indicating one or more of said available frequency bands to be used by said wireless terminal.

In one exemplary embodiment, a communications device includes at least one processor configured to: determine the location of the wireless terminal; communicate information indicating the location of a wireless terminal to a control device; and receive information indicating one or more of said available frequency bands to be used by said wireless terminal.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
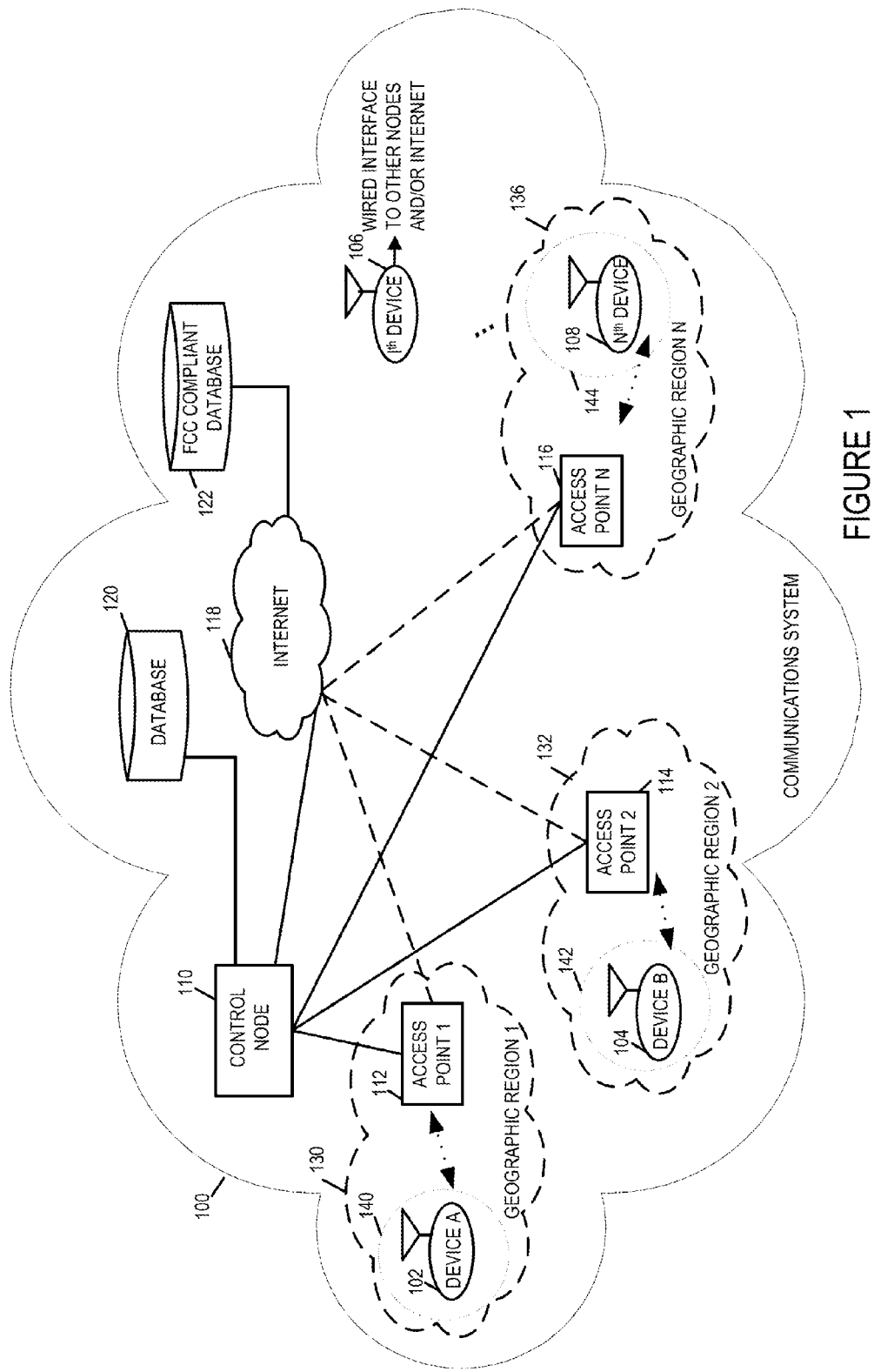
FIG. 1 illustrates an exemplary communications system, in accordance with various exemplary embodiments.

FIG. 1 illustrates an exemplary communications system 100, in accordance with various exemplary embodiments. Exemplary communications system 100 includes a plurality of communications devices (device A 102, device B 104, $I^{th}$ device 106, ..., $N^{th}$ communications device 108). The communications devices 102, 104, 106, 108, are, e.g., wireless terminals such as mobile terminals, which support peer to peer communications, e.g., direct peer to peer communications as part of a local peer to peer network, and support infrastructure based communications. The infrastructure based communications may be, e.g., via an access point such as a base station. The base station may be, and in some embodiments, is part of a cellular communications network. Some of the wireless communications devices support a plurality of different wireless technologies and/or protocols which may be used for peer to peer communications. Some of the wireless communications devices, e.g., device 106, include a wired interface to other network nodes and/or the Internet.

Communications system 100 further includes a control node 110 which is coupled to a database 120, e.g., a database supporting peer to peer air link resource allocation and/or peer discovery, and to an FCC (Federal Communications Commission) compliant database 122, as shown in FIG. 1. The FCC database 122 can be accessed by one or more devices in the communications system 100, e.g., via the Internet 118. In some, but not necessarily all, embodiments, one or more of communications devices (102, 104, 106, ... 108) are implemented as portable communications devices or wireless terminals such as handheld cell phones or portable personal data assistant (PDA) devices.

Various wireless communications devices may be operating in different geographic regions at a given point in time. In this example, each of the geographic regions (geographic region 1 130, geographic region 2 132, ... geographic region N 136) are associated with a corresponding access point (access point 1 112, access point 2 114, ..., access point N 116), respectively. The access points (112, 114, ... 116) are, e.g., base stations. Thus, a wireless communications device, e.g., a wireless terminal, can communicate with control node 110, via an access point, e.g. using cellular communications signaling. In addition, in various embodiments, within a geographic region, e.g., within geographic region 1 130, there are a plurality of smaller regions such as exemplary region 140. In the smaller region 140 one or more local peer to peer networks may be operating and a plurality of wireless communications devices may be included within the region 140. In a region such as region 140, different peer to peer networks may be, and sometimes are, operating concurrently, e.g., using different frequency bands. In a region such as region 140, different peer to peer networks may be, and sometimes are, operating concurrently, e.g., using different technologies. In a region such as region 140, in some embodiments, two different peer to peer networks, e.g., using different technologies, may, and sometimes do, share the same frequency band, e.g. with each network being allocated portions of time.

A wireless communications device location may change as the device moves throughout the system 100. As shown in FIG. 1, device A 102 is located in geographic region 1 130, which is served by access point 1 112; device B 104 is located in geographic region 2 132, which is served by access point 2 114; and $N^{th}$ device 108 is located in geographic region N 136, which is served by access point N 116. The access points 112, 114, 116 include a wireless interface supporting a cellular based signaling protocol and a wired interface providing coupling to a backhaul network. The access points in different regions provide access to the Internet and/or other network nodes via, e.g., a wired or fiber network connection. It should be appreciated that the control node 110 may be implemented, in at least some embodiments, in a way that it can serve a plurality of access points in different regions. Various access points, in some embodiments, a coupled via a backhaul link, with control node 110 for exchanging information.

In accordance with one aspect of some embodiments, one or more frequency bands, e.g., corresponding to TV channels, may be, and sometimes are, available for use by communications devices at various locations for communications purposes, e.g., for peer to peer communications, e.g., as part of a local peer to peer network. At some locations in the communications system 100 at a given time the same frequency band or bands may be available for use for peer to peer communications. At some locations in the communications system 100 at a given time a different frequency band or bands may be available for use for peer to peer communications. The dotted circles (140, 142 and 144) around the communications devices (102, 104 and 108) illustrate a small region, e.g., with a radius of 10-15 meters in one example, where the respective devices happen to be located at one exemplary time. It should be appreciated that each of the geographic regions (130, 132, ..., 136) includes a plurality of smaller designated regions. Smaller regions (140, 142, 144) are much smaller in size compared to their corresponding larger size geographic regions (130, 132, 136), which area coverage areas of each of the access points (112, 114 and 116), respectively.

The communications devices (102, 104, 108) may be assigned, e.g., by control node 110, one or more frequency bands, which may be currently available in the respective regions (140, 142, 144) where the devices are located, for use in peer to peer communications. In some embodiments various communications devices, e.g., communications devices 102, 104 106, and 108 perform channel sensing in order to detect available frequency bands and/or determine channel conditions, e.g., interference levels, etc. In one such example the channel sensing is performed by devices 102, 104, 108 in the area represented by the dotted circles 140, 142 and 144 to detect available frequency bands which can be used for peer to peer communications. In some embodiments, a wireless communications device, e.g., device A 102, detects for the presence of signaling which has priority over peer to peer signaling in accordance with FCC rules and/or regulations, e.g., TV signaling and/or wireless microphone signaling.

In various embodiments, a wireless communications device, which desires to participate in a local peer to peer network, reports detected sensing information to a control node. In some such embodiments, the control node, uses the information from the received information from the wireless communications along with FCC database information, in deciding which channel to allocate to the wireless communications device for peer to peer communications. Thus, in various embodiments, control node 110 controls and coordinates peer to peer channel allocation throughout system 100, e.g., assigning particular wireless communications devices to particular frequency bands and/or particular technologies and/or communications protocols to use for peer to peer communications at a location and time.

In some embodiments, communications device (102, 104, 106, ..., 108) may operate as end nodes and may support one or more communications technologies, e.g., a wireless communications technology such as, e.g., CDMA, GSM, Bluetooth, WiFi, other OFDM based technologies, etc., for communication purposes. In various embodiments, at least some of these communications technologies support local peer to peer network signaling. Different devices may support different sets of communications technologies and/or communications protocols. Some communications devices in the system 100, e.g., $I^{th}$ communications device 106 may have a connection, e.g., a wired or fiber network connection, to other nodes and/or the Internet and can provide such connectivity and/or access to other devices and databases. However, such a connection is optional.

Figure 2:
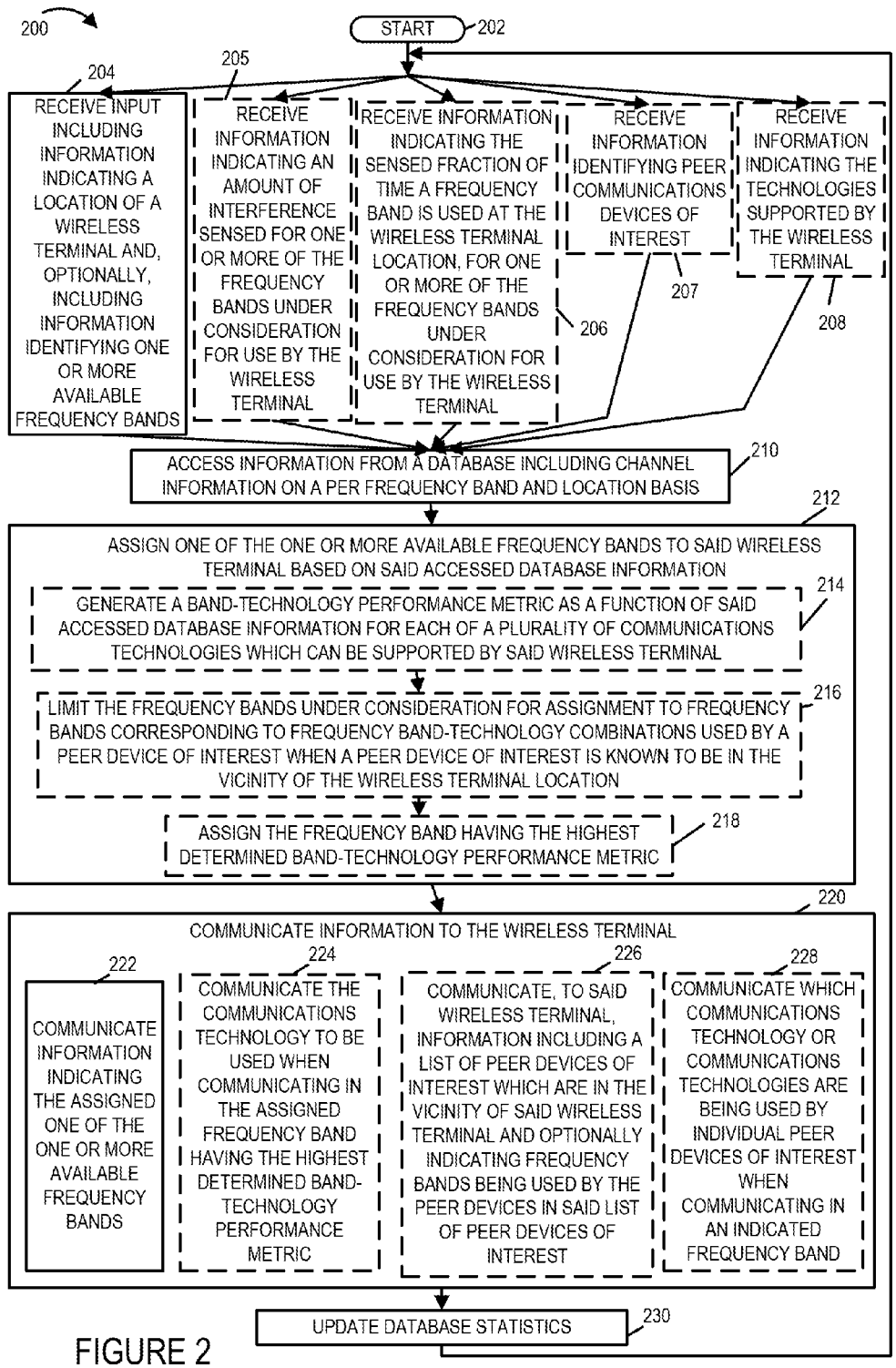
FIG. 2 is a flowchart of an exemplary communications method of allocating a frequency band for wireless communications in accordance with various exemplary embodiments.

FIG. 2 is a flowchart 200 illustrating an exemplary communications method of allocating a frequency band for wireless communications in accordance with an exemplary embodiment. In some embodiments the exemplary communications method is implemented by a control node, e.g., control node 110 of communications system 100 of FIG. 1. The method of flowchart 200 will be described using exemplary control node 110 and exemplary device A 102, e.g., a mobile wireless terminal, of FIG. 1. In the exemplary method of flowchart 200, control node 110 assigns one or more frequency bands corresponding to white space, e.g., unused TV channels, to device A 102, e.g., a mobile wireless terminal.

Operation of the exemplary method starts in step 202, where the control node is powered on and initialized. Operation proceeds from start step 202 to step 204. In some embodiments, operation also proceeds from start step 202 to one or more of optional steps 205, 206, 207 and 208.

Returning to step 204, in step 204, the control node receives input including information indicating a location of a wireless terminal and, optionally, information identifying one or more available frequency bands. In some embodiments, the available frequency bands are frequency bands which are available to be used for peer to peer signaling. In some embodiments, the available frequency bands correspond to TV channels, e.g., unused TV channels at a particular location.

In some embodiments, said input including information indicating a location of a wireless terminal is received from the wireless terminal. For example, in some embodiments, a wireless terminal may include a GPS receiver and communicates its location. In some embodiments, said information including information indicating a location of a wireless terminal is received from an access point, e.g., a base station, which tracks the location of wireless terminals within its coverage area, e.g., based on received power measurements and/or other location determination techniques. In some embodiments, the input including a location of the wireless terminal is received from a location tracking node, e.g., a server dedicated to tracking device locations in the system.

In various embodiments, the information identifying one or more available frequency bands is based on channel information sensed by the wireless terminal. For example, the wireless terminal may identify one or more frequency bands that may be used for peer to peer communications from its perspective based on: retrieved FCC information of unlicensed and/or unused spectrum, local sensing of active TV channels, local sensing of communications which have precedence over peer to peer communications in accordance with FCC rules and/or regulations such as, e.g., wireless microphone communications, and/or local sensing of active peer to peer communications. In various embodiments, the wireless terminal senses and/or measures, a fraction of time a frequency band at its location is being used for peer to peer communications and/or for other communications, e.g., for one or more frequency bands. Operation proceeds from step 204 to step 210.

Returning to step 205, in step 205, the control node receives information indicating an amount of interference sensed for one or more of the frequency bands under consideration for use by the wireless terminal. In various embodiments, the wireless terminal performs the sensing and communicates the sensing results to the control node, e.g., via an access node. Operation proceeds from step 205 to step 210.

Returning to step 206, in step 206, the control node receives information indicating the sensed fraction of time a frequency band is used at the wireless terminal location, for one or more frequency bands under consideration for use by the wireless terminal. In various embodiments, the wireless terminal performs the sensing and communicates its results to the control node, e.g. via an access node. Operation proceeds from step 206 to step 210.

Returning to step 207, in step 207 the control node receives information identifying peer communications devices of interest. For example, the wireless terminal, in some embodiments, generates a list identifying peer communications devices of interest to the wireless terminal and sends the generated list to the control node, e.g. via an access point. Operation proceeds from step 207 to step 210.

Returning to step 208, in step 208 the control node receives information indicating the technologies supported by the wireless terminal. In some embodiments, the information indicating the technologies supported by the wireless terminal is received from the wireless terminal, e.g., received indirectly through an access point. Operation proceeds from step 208 to step 210.

In FIG. 2 steps 204, 205, 206, 207 and 208 are shown as being in parallel. In various embodiments, one or more of steps 204, 205, 206, 207 and 208 are performed in series. Various parallel/series combinations of steps are also possible.

In step 210 the control node accesses information from a database including channel information on a per frequency band and location basis. In some embodiments, the accessed information indicates channel usage information. In some such embodiments, the accessed information further indicates at least one of: interference detected at the wireless terminal location and a fraction of time a frequency band is used at the wireless terminal. In some such embodiments, the accessed information indicates the fraction of time a frequency band is used at the wireless terminal on a per technology basis. In various embodiments, the channel usage information includes information indicating the number of devices currently using a frequency band at the wireless terminal location. In some embodiments, the number of devices currently using a frequency band includes per technology device number information.

Operation proceeds from step 210 to step 212. In step 212 the control node assigns one or more available frequency bands to said wireless terminal based on said accessed database information. In various embodiments, step 212 includes one or more of steps 214, 216 and 218. In step 214 the control node generates a band-technology performance metric as a function of said accessed database information for each of a plurality of communications technologies which can be supported by said wireless terminal. Then, in said 216 the control node limits the frequency bands under consideration for assignment to frequency bands corresponding to frequency band-technology combinations used by a peer device of interest when a peer device of interest is known to be in the vicinity of the wireless terminal location. Operation proceeds from step 216 to step 218, in which the control node assigns the frequency band having the highest determined band-technology performance metric. Operation proceeds from step 212 to step 220.

In step 220 the control node communicates information to the wireless terminal. Step 220 includes step 222, and in some embodiments, step 220 includes one or more of steps 224, 226 and 228. In step 222 the control node communicates information indicating the assigned one of the one or more available frequency bands. In step 224 the control node communicates the communications technology to be used when communicating in the assigned frequency band having the highest determined band-technology performance metric. In step 226 the control node communicates to said wireless terminal information including a list of peer devices of interest which are in the vicinity of the wireless terminal and optionally information indicating frequency bands being used by the peer devices in said list of peer devices of interest. In step 228 the control node communicates which communications technology or communications technologies are being used by individual peer devices of interest when communicating in an indicated frequency band.

Operation proceeds from step 220 to step 230 in which the control node updates database statistics. Then, operation proceeds from step 230 to the input of step 204, and optionally to the input of step 206 and/or step 208.

Flowchart 200 of FIG. 2 is described with regard to frequency band assignment for a wireless terminal, e.g., device A 102, by control node 110 of FIG. 1. However, it should be appreciated that the control node 110 controls assignments for a plurality of wireless terminals, and thus the steps of flowchart 200 are repeated by the control node 110 corresponding to each of the plurality of wireless terminals for which frequency band assignment, e.g., for peer to peer use, are being performed.

Figure 3:
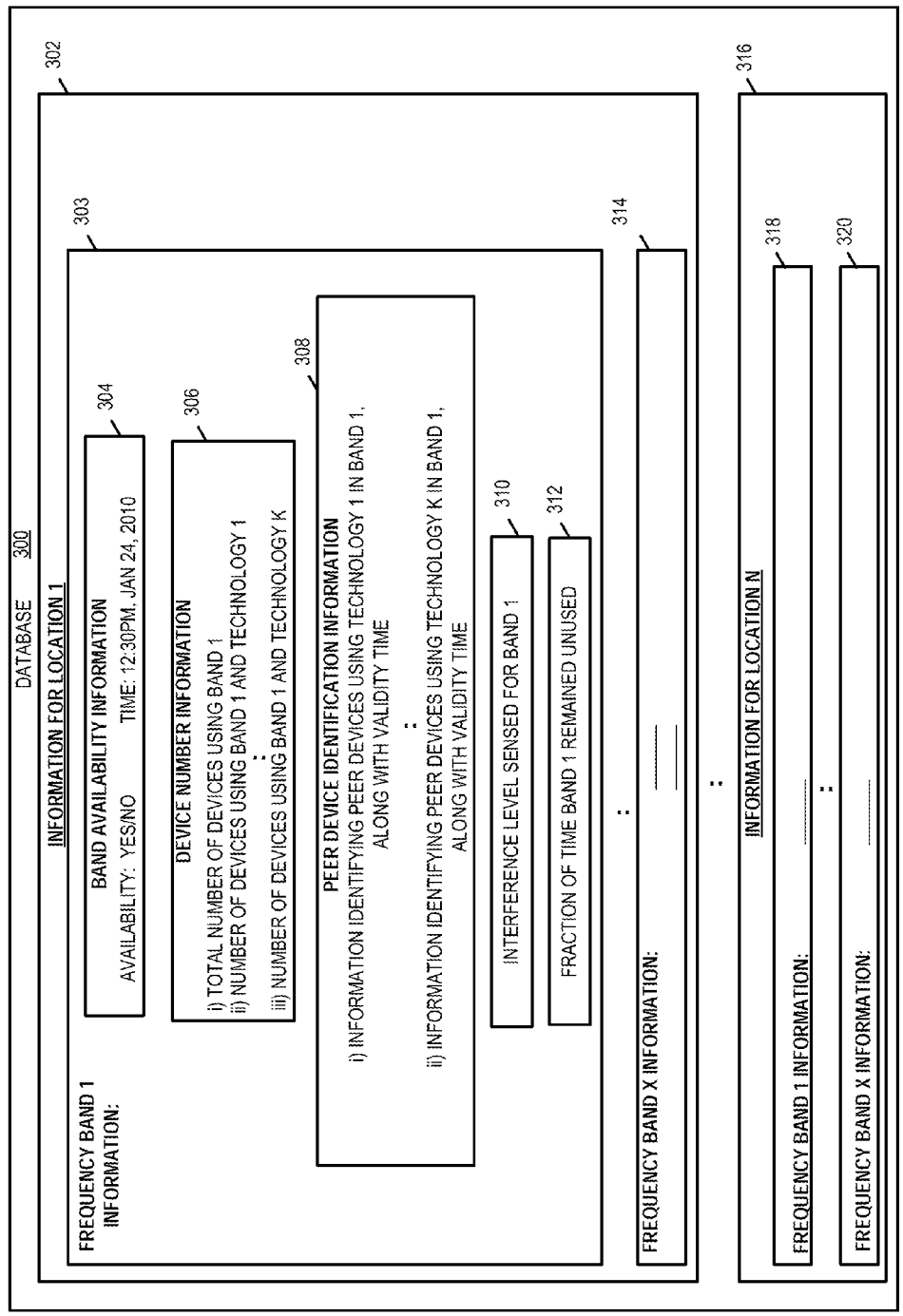
FIG. 3 illustrates an exemplary database that can be used in the system of FIG. 1, implemented in accordance with an exemplary embodiment.

FIG. 3 illustrates an exemplary database 300 that may be accessed by one or more communications devices and/or nodes of system 100 of FIG. 1. The database 300 can be implemented as the exemplary database 120 of FIG. 1. In some embodiments database 300 is implemented as a centralized database used in coordinating usage of the frequency bands, e.g., corresponding to TV channels, which have been made available for use by the FCC. In various embodiments the database 300 is managed and/or controlled by the control node 110 shown in FIG. 1. The database 300 includes channel information on a per frequency band and location basis and is accessed by the control node 110 to, among other things, make frequency band assignment decisions, for assignment of one or more frequency bands to a communications device, e.g., wireless terminal 102. Information maintained in database 300 is received from one or more communications devices, e.g., wireless terminals operating at various locations and/or based upon information received from one or more communications devices, e.g., wireless terminals operating at various locations. In some embodiments, at least some information included in database 300 is obtained from and/or based on information obtained from an FCC compliant database, e.g., FCC compliant database 122 of FIG. 1. The database 300 may, and in various embodiments is, updated on a periodic basis. In some embodiments the channel statistics are updated in the database 300 each time a new channel assignment is made.

As illustrated in FIG. 3, the database 300 includes information on a per frequency band basis for each of the locations where frequency bands, e.g. corresponding to TV channels, are available for use by communications devices. In one embodiment shown in FIG. 3, database 300 includes information for N locations for which the frequency band information is available. In this example, each location includes information corresponding to total number of, e.g., say X, frequency bands, which correspond to the TV channels which may be assigned for wireless communications depending on availability at the given location and time, and one or more other factors. Thus sets of information for each location (information for location 1 302, . . . , information for location N 316) are included in the database 300.

Information for location 1 302 includes different sets of information corresponding to each of the frequency bands from 1 to X which may be available at location 1 (frequency band 1 information 303, . . . , frequency band X information 314). For each other location up to location N, similar information is available, for example information for location N 316 also includes similar information for frequency bands that may be available at location N including frequency band 1 information 318 through frequency band X information 320.

Frequency band 1 information 303 for location 1 includes a plurality of sets of information corresponding to the frequency band 1/location 1 combination, including band availability information 304, device number information 306, peer devices identification information 308, interference level sensed for band 1 310, and information regarding fraction of time band 1 remained unused 312. Each of these sets of information for band 1 will be discussed here and it is understood that similar information for various other frequency bands at location 1 may be available.

Band availability information 304 includes information regarding the availability of the frequency band and, in some embodiments, includes corresponding time information. In some embodiments, the time information includes a time stamp, e.g., a time stamp indicating the last time availability information was updated, e.g., Jan. 24, 2010 12:30 PM. In some embodiments, the time information includes an expiration time. In some embodiments, the time information includes a range of time. The band availability information 304 stored in database 300, in some embodiments, is obtained from an FCC compliant database, e.g., database 122, which maintains such information regarding various frequency bands which may be available at various locations. Prior to making frequency band assignment decision, the control node 110 accesses database 300 and considers the band availability information, e.g., band availability information 304, in making assignment decisions.

Device number information 306 includes information such as the total number of communications devices, e.g., peer to peer communications devices, using band 1 in location 1 at a given time. Information 306, in some embodiments, is updated regularly. Information 306 also includes information regarding frequency band usage by communications devices on per technology basis, e.g., number of communications devices using band 1 and communications technology 1, number of devices using band 1 and communications technology 2, . . . , number of devices using band 1 and communications technology K. By accessing information 306 the control node 110 gets an idea as to how congested the frequency band is when the frequency band is indicated as being available, and using information 306 the control node 110 may analyze which communications technology combination may be more effective for a communications device if frequency band 1 is assigned to it. Thus control node 110 may make a frequency band assignment decision, at least in part, after considering information 306.

Peer device identification information 308, includes identification information regarding peer devices which are using frequency band 1, on a per technology basis along with corresponding validity times. Information set 308 includes info identifying peer devices using technology 1 in band 1, . . . , information identifying peer devices using technology K in band 1. For example, information identifying peer devices using technology 1 in band 1 may list identification information corresponding to 6 peer devices along with a validity time for each device that indicates a time for which a device has been granted to use frequency band 1.

Information 310 is the information regarding the interference level sensed for frequency band 1. The sensed interference level information may be received from one or more communications devices operating at location 1 which perform channel sensing operation and report the interference to the control node 110. The control node 110 in turn updates the stored interference information in database 300. In some embodiments interference information 310 is calculated as the summation of each of the individual sensed interference reports received from one or more communications devices operating at location 1.

Information set 312 is the information regarding the time frequency band 1 (or a portion of band 1) remains unused. As discussed earlier, individual communications devices perform channel sensing operation at different locations and may notice the time period for which the channel remains unused and report it. In some embodiments information 312 is calculated based on each of the individual reported fraction of times the frequency band remains unused, received from one or more communications devices operating at location 1. In some embodiments, information 312 represents loading on the channel. It should be appreciated that various sets of information similar to the sets of information 304, 306, 308, 310 and 312 described with regards to frequency band 1 information 302, are maintained for each individual frequency band and for each of the N locations.

Figure 4:
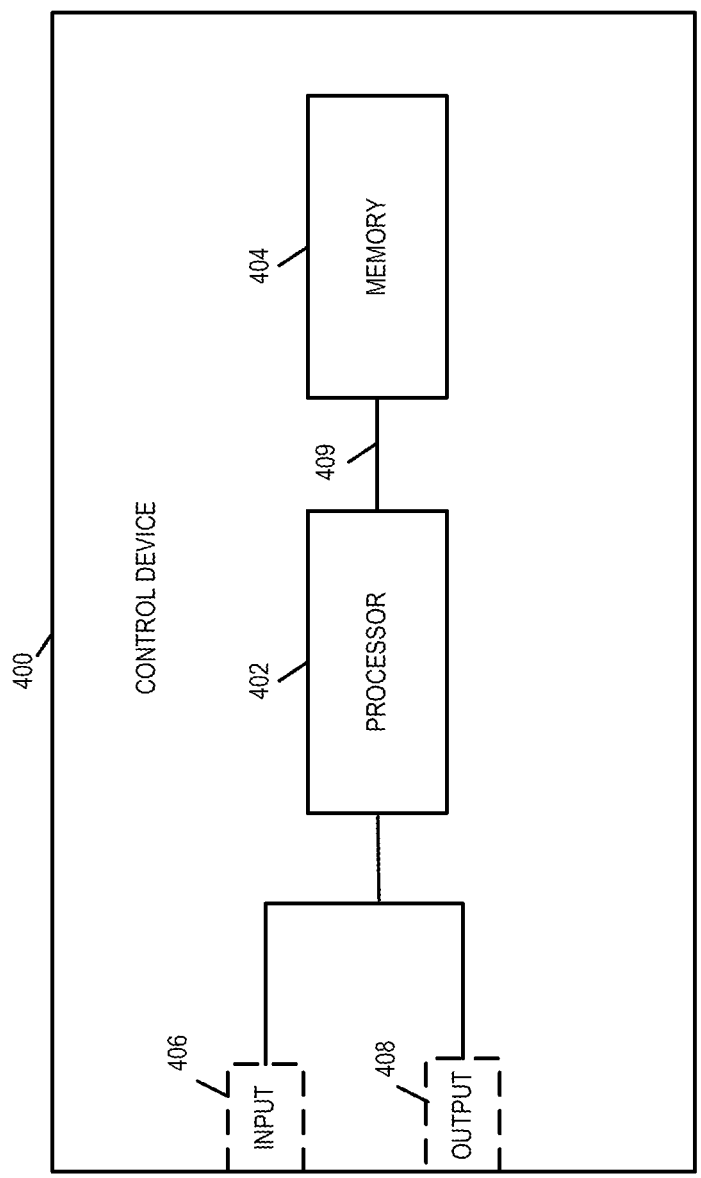
FIG. 4 illustrates an exemplary control device which can be used in the system of FIG. 1.

FIG. 4 illustrates an exemplary control device 400 implemented in accordance with one exemplary embodiment. Control device 400 is, e.g., control node 110 as shown in FIG. 1. Control device 400 may, and in some embodiments does implement the steps of the method of flowchart 200 shown in FIG. 2. Control device 400 includes a processor 402 and memory 404 coupled together via a bus 409 over which the various elements (402, 404) may exchange data and information. Input module 406 can receive input signals. Input module 406 can, and in some embodiments does, include a wireless receiver and/or a wired or optical input interface for receiving input. Output module 408 may include, and in some embodiments does include, a wireless transmitter and/or a wired or optical output interface for transmitting output signals.

Processor 402, in some embodiments, is configured to: receive input including information indicating a location of a wireless terminal; access information from a database including channel information on a per frequency band and location basis; and assign one of said one or more available frequency bands to the wireless terminal based on said accessed database information. In some embodiments, processor 402 is further configured to receive information identifying one or more available frequency bands as part of being configured to receive input. Processor 402 is further configured to communicate the assigned one of said one or more available frequency bands to said wireless terminal.

In some embodiments the input including information indicating a location of a wireless terminal is received from said wireless terminal. In some embodiments the information identifying one or more available frequency bands is based on channel information sensed by said wireless terminal. In some embodiments, the accessed information indicates channel usage information. In some embodiments the accessed information further indicates at least one of: interference detected at the wireless terminal location and a fraction of time the frequency band is used at the wireless terminal location. In various embodiments, the accessed information indicates the fraction of time a frequency band is used at the wireless terminal location on a per technology basis. In some embodiments, the channel usage information includes information indicating the number of devices currently using a frequency band at the wireless terminal location. In some such embodiments, the number of devices currently using the frequency band includes per technology device number information.

The processor 402, in some embodiments, is further configured to receive information indicating the technologies supported by said wireless terminal. In some embodiments, the information indicating the technologies supported by the wireless terminal is received from the wireless terminal, e.g., indirectly through an access point. Processor 402, in some embodiment, is further configured to generate a band-technology performance metric as a function of said accessed database information for each of a plurality of communications technologies which can be supported by said wireless terminal. In some embodiments processor 402 is configured to assign the frequency band having the highest determined band-technology performance metric to the wireless terminal, e.g., to use for peer to peer communications. The processor 402, in some embodiments, is further configured to communicate a communications technology to be used when communicating in the assigned frequency band having the highest determined band-technology performance metric.

In some embodiments the processor 402 is configured to receive information from the wireless terminal identifying peer communications devices of interest. In some such embodiments the processor 402 is further configured to limit the frequency bands under consideration for assignment to frequency bands corresponding to frequency band-technology combinations used by a peer device of interest when a peer device of interest is known to be in the vicinity of the wireless terminal location, as part of being configured to assign one or more available frequency bands.

In some embodiments the processor 402 is configured to communicate to the wireless terminal, information including a list of peer communications devices of interest which are in the vicinity of said wireless terminal and indicating frequency bands being used by the peer communications devices in said list of peer communications devices of interest. In some embodiments the processor 402 is configured to communicate which communications technology or communications technologies are being used by individual peer communications devices of interest when communicating in an indicated frequency band.

Figure 5:
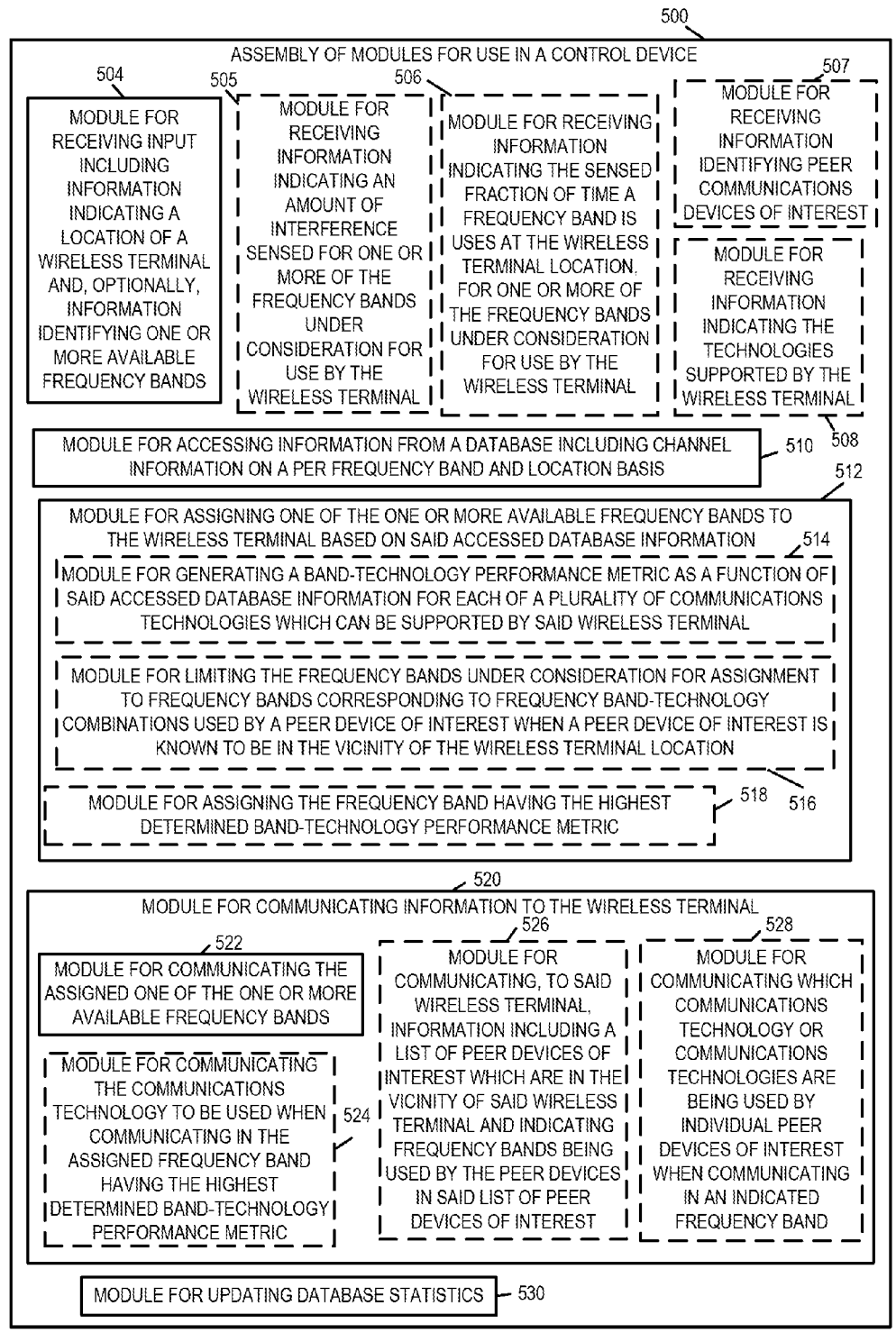
FIG. 5 illustrates an assembly of modules which can be used in the exemplary control device of FIG. 5.

FIG. 5 is an assembly of modules 500 which can, and in some embodiments are, used in control node 400, illustrated in FIG. 4. The modules in the assembly 500 can be implemented in hardware within the processor 402 of FIG. 4, e.g., as individual circuits. Alternatively, the modules may be implemented in software and stored in the memory 404 of the control device 400 shown in FIG. 4. While shown in the FIG. 4 embodiment as a single processor, e.g., computer, it should be appreciated that the processor 402 may be implemented as one or more processors, e.g., computers.

When implemented in software the modules include code, which when executed by the processor 402, configure the processor to implement the function corresponding to the module. In embodiments where the assembly of modules 500 is stored in the memory 404, the memory 404 is a computer program product comprising a computer readable medium comprising code, e.g., individual code for each module, for causing at least one computer, e.g., processor 402, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 5 control and/or configure the control device 400 or elements therein such as the processor 402, to perform the functions of the corresponding steps illustrated in the method flowchart 200 of FIG. 2.

The assembly of modules 500 includes a module corresponding to each step of the method shown in FIG. 2. The module in FIG. 5 which performs or controls the processor 402 to perform a corresponding step shown in flowchart 200 is identified with a number beginning with a 5 instead of beginning with 2. For example module 504 corresponds to step 204 and is responsible for performing the operation described with regard to step 204. As illustrated in FIG. 5, the assembly of modules 500 includes a module 504 for receiving input including information indicating location of a wireless terminal and, optionally, information identifying one or more available frequency bands. In some embodiments, assembly of modules 500 further includes one or more of: module 505 for receiving information indicating an amount of interference sensed for one or more of the frequency bands under consideration for use by the wireless terminal, a module 506 for receiving information indicated the sensed fraction of time a frequency band is used at the wireless terminal location, for one or more of the frequency bands under consideration for use by the wireless terminal, a module 507 for receiving information identifying peer communications devices of interest and a module 508 for receiving information indicating the technologies supported by the wireless terminal.

The assembly of modules 500 further includes a module 510 for accessing information from a database including channel information on a per frequency band and location basis, and a module 512 for assigning one of the one or more available frequency bands to the wireless terminal based on said accessed database information. The assignment module 512, in some embodiments includes one or more of: a module 514 for generating a band-technology performance metric as a function of said accessed database information for each of a plurality of communications technologies which can be supported by the wireless terminal, module 516 for limiting the frequency bands under consideration for assignment, to frequency bands corresponding to frequency band-technology combinations used by a peer device of interest, when a peer device of interest is known to be in the vicinity of the wireless terminal location, and a module 518 for assigning the frequency band having the highest determined band-technology performance metric to the wireless terminal, e.g., to use for peer to peer communications.

The assembly of modules 500 further includes a module 520 for communicating information to the wireless terminal and a module 530 for updating database statistics, e.g., for updating various sets of information in database 300. Module 502 includes a module 522 for communicating the assigned one of the one or more available frequency bands to the wireless terminal. In some embodiments, module 520 includes one or more of: a module 524 for communicating the communications technology to be used when communicating in the assigned frequency band having the highest determined band-technology performance metric, a module 526 for communicating, to said wireless terminal, information including a list of peer devices of interest which are in the vicinity of said wireless terminal and indicating frequency bands being used by the peer devices of interest in said list of peer devices of interest, and a module 528 for communicating which communications technology or communications technologies are being used by individual peer devices of interest when communicating in an indicated frequency band.

In some embodiments, the input including information indicating a location of a wireless terminal is received from the wireless terminal, e.g., indirectly through an access point. In various embodiments, the accessed information indicates channel usage information. In some embodiments, the accessed information further indicates at least one of: interference detected at the wireless terminal location and a fraction of time the frequency band is used at the wireless terminal location. In some embodiments, the accessed information indicates the fraction of time the frequency band is used at the wireless terminal location on a per technology basis. In various embodiments, the channel usage information includes information indicating a number of devices currently using a frequency band at the wireless terminal location. In some such embodiments, the number of devices currently using the frequency band includes per technology device number information.

In some embodiments, the received information indicating the technologies supported by the wireless terminal is received from the wireless terminal, e.g., indirectly through an access point.

Figure 6A:
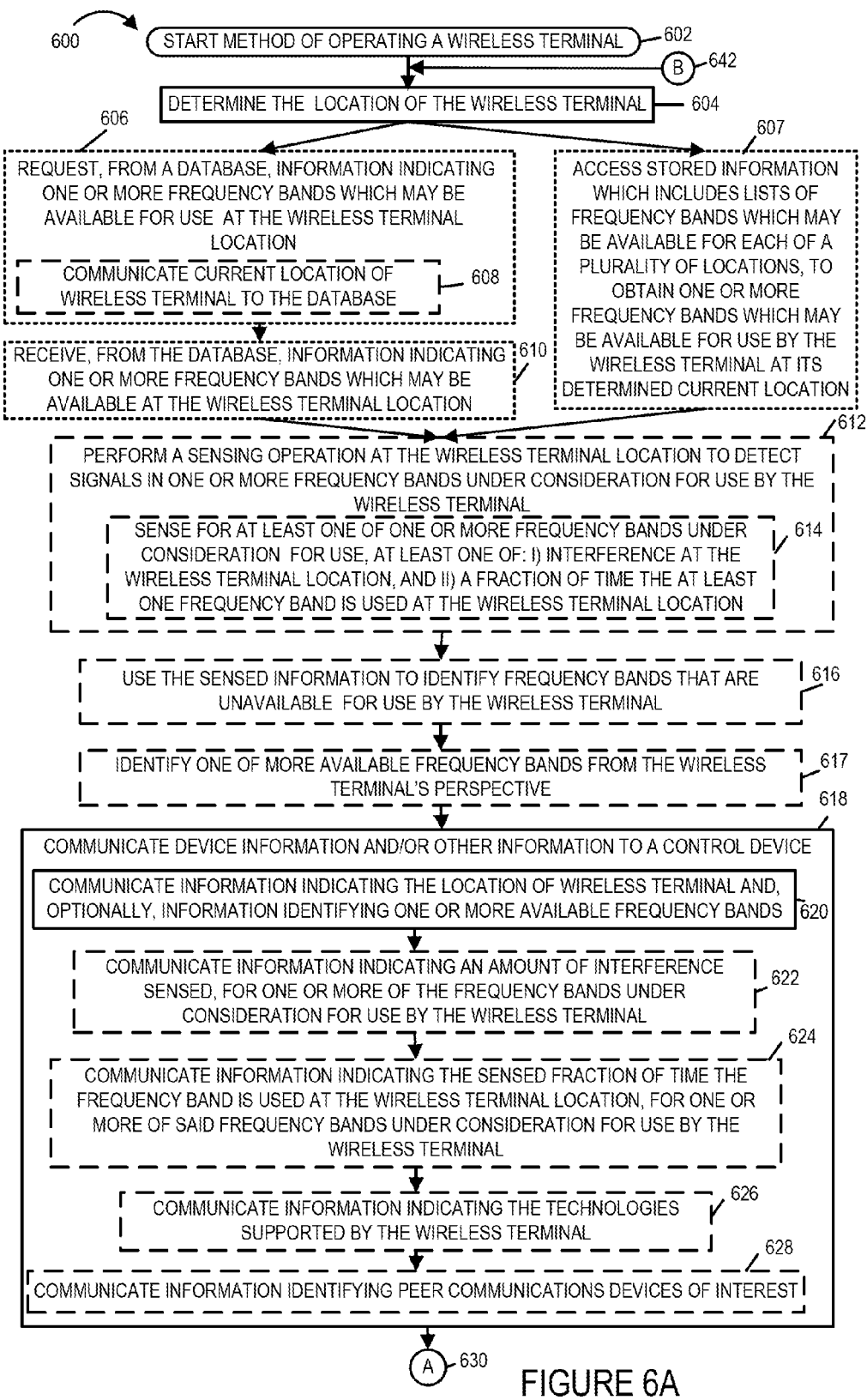
FIG. 6A is a first part of a flowchart of an exemplary method of operating a communications device, e.g., wireless terminal, in accordance with an exemplary embodiment.
Figures 6, 6A, 6B:
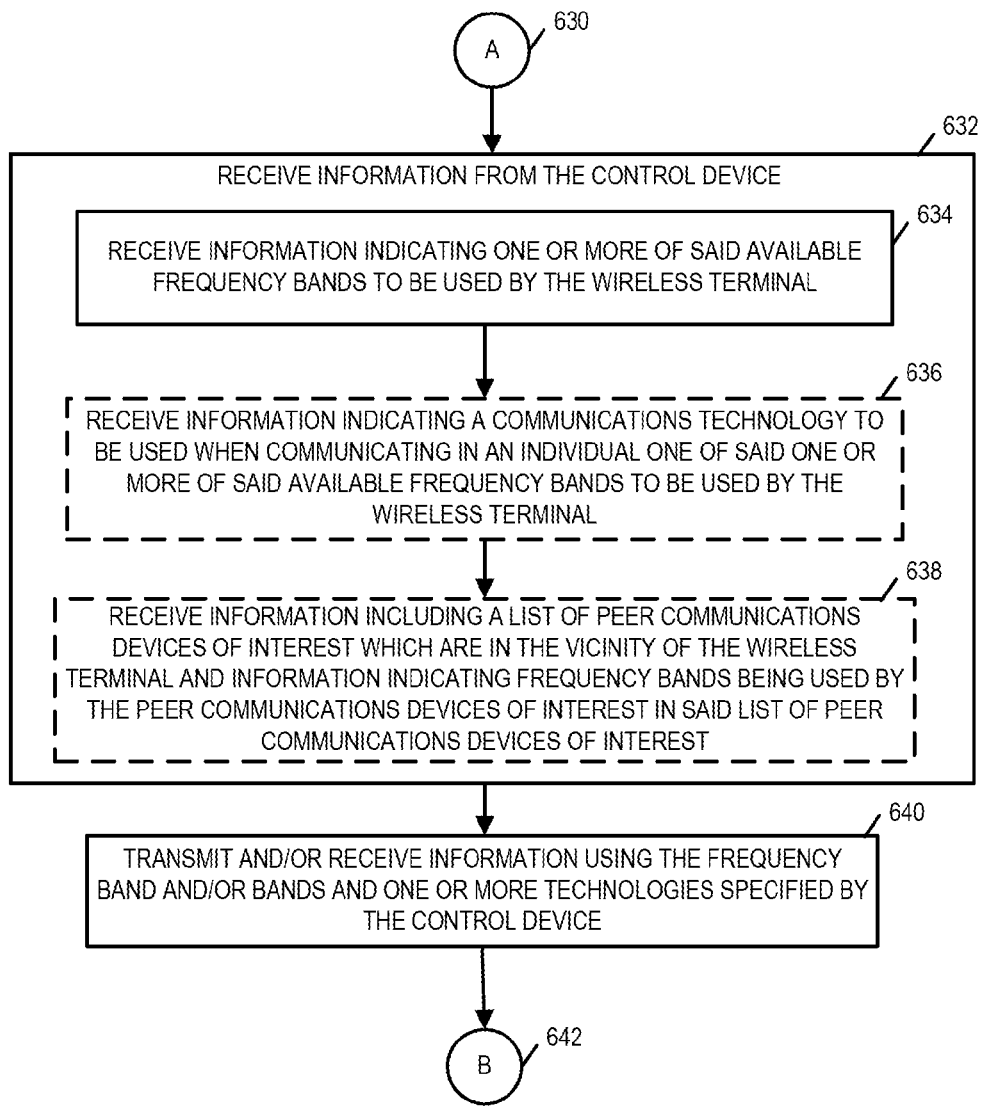
FIG. 6B is a second part of a flowchart of an exemplary method of operating a communications device, e.g., wireless terminal, in accordance with an exemplary embodiment.

FIG. 6 is a flowchart 600 illustrating the steps of an exemplary communications method of operating a wireless terminal, in accordance with one exemplary embodiment. In some embodiments the exemplary method is implemented by the communications device 102, e.g., a mobile portable wireless terminal, of communications system 100, shown in FIG. 1. In accordance with one aspect various frequency bands, e.g., corresponding to unused TV channels, are available for wireless communications, e.g., are available for wireless peer to peer communications.

The exemplary method starts in step 602 where the wireless terminal, e.g., device 102, is powered on and initialized. Operation proceeds from the start step 602 to step 604 where the wireless terminal determines its location. The wireless terminal, in some embodiments, includes a GPS receiver capable of receiving GPS signals and determines its location based on received GPS signals. Based on its determined location, a wireless terminal may fall within one of the locations for which frequency band related information is maintained, e.g., location 140. In some embodiments, operation proceeds from step 604 to step 606. In some other embodiments, operation proceeds from step 604 to step 607. In some embodiments, operation proceeds from step 604 to step 618.

Returning to step 604, in step 604 the wireless terminal requests information from a database, e.g., through an access point, said requested information indicating one or more frequency bands which may be available for use at the wireless terminal location. This information regarding the availability of frequency bands corresponding to available spectrum, e.g., corresponding to unused TV channels, at a given location, in some embodiments, is maintained in an FCC compliant database, e.g., database 122. In some embodiments step 606 includes step 608 in which the wireless terminal communicates its current location to the database, e.g., to FCC compliant database 122.

Operation proceeds from 606 to step 610. In step 610 the wireless terminal obtains information indicating one or more frequency bands which may be available at the wireless terminal location, from the database. In some embodiments this information is received via an access point, e.g., access point 112, which serves the area where the wireless terminal is currently located. Operation proceeds from step 610 to step 612.

Returning to step 607, in step 607 the wireless terminal accesses stored information, which includes lists of frequency bands which may be available for each of a plurality of locations, to obtain one or more frequency bands which may be available for use by the wireless terminal at its current location. In some embodiments, the stored information has been previously stored within the wireless terminal, e.g., as part of a download corresponding to one or more locations and/or as part of a pre-load. In some embodiments, the wireless terminal determines if its determined location from step 604 falls within one of the site locations for which one or more frequency bands may be available. For example, the wireless terminal may determine that its current location falls within the region of site location 140, and then the wireless terminal accesses information corresponding to location 140 which includes a list of frequency bands which may be available at location 140. Operation proceeds from step 607 to step 612.

In step 612 the wireless terminal performs a channel sensing operation at the wireless terminal location to detect signals in one or more frequency bands under consideration for use by the wireless terminal. The one or more frequency bands under consideration could be the full set of the frequency bands which may be available at the location as indicated by the information received, e.g., in step 610 or step 607, or a subset of the frequency bands indicated in the received information. Channel sensing allows the wireless terminal 102 to determine the frequency bands which are actually available as compared to those frequency bands which may be available. For example, some spectrum, e.g., bands, which may be potentially available for peer to peer signaling use, e.g., based on FCC information identifying unused TV channels at a location, may be at times unavailable for peer to peer signaling usage, due to higher priority signaling, e.g., in accordance with FCC rules and/or regulations. For example, some wireless microphone signaling may have priority over peer to peer local network signaling. For example, the wireless terminal performs channel sensing and examines each frequency band to detect signals. One or more frequency bands on which no signals above, e.g., a threshold, are detected may be considered as being available for use at the wireless terminal location. If the signals detected on a frequency band are above the threshold, it may be considered as being already occupied. If the detected signals above a threshold on a band correspond to a category which has priority over peer to peer signaling in accordance with FCC rules and/or regulations, e.g., wireless microphone signaling, the band may be considered unavailable. If the detected signals above a threshold correspond to peer to peer signaling, in some embodiments, the wireless terminal senses the type of peer to peer signaling, e.g., technology and/or protocol being used, and/or senses the fraction of time the band is being used for the particular type of peer to peer signaling. In some embodiments, the wireless terminal senses an amount of interference on a band. In some embodiments, the wireless terminal senses a fraction of time the band is being used, e.g., being used for peer to peer signaling.

In some embodiments as part of performing channel sensing in step 612, step 614 is performed wherein the wireless terminal performs sensing in at least one of one or more frequency bands under consideration for use, to sense at least one of i) interference at the wireless terminal location, and ii) a fraction of time the at least one frequency band is used at the wireless terminal location. Thus, in some embodiments, the wireless terminal may, and sometimes does, perform interference estimation on at least one frequency band. In some embodiments, the wireless terminal determines the fraction of time the frequency band is used at the wireless terminal location, e.g., for peer to peer signaling.

Operation proceeds from step 612 to step 616. In step 616 the wireless terminal uses the sensed information from step 612 to identify frequency bands that are unavailable for use by the wireless terminal, e.g., for peer to peer signaling. For example, one frequency band on the list of possible frequency bands obtained from step 610 or step 607 may be removed from consideration because a signal was detected, e.g., wireless microphone signaling was detected, which has priority over peer to peer signaling usage for the spectrum in accordance with FCC rules and/or regulations. As another example, another band may be removed from consideration because the band is being fully or nearly fully utilized for peer to peer signaling using a technology which is not supported by the wireless terminal. Operation proceeds from step 616 to step 617.

In step 617 the wireless terminal identifies one or more available frequency bands from the wireless terminal's perspective. For example, the wireless terminal, in step 616 takes a list of one of more frequency bands which may be available based on FCC information, which was obtained in step 610 or step 607, and removes bands which have been identified in step 616. Thus, the set of one or more available bands of step 617 may include the full set of bands from step 610 or 607, in the situation in which step 617 did not identify any bands that were unavailable. Alternatively, the set of one or more available bands of step 617 includes a subset of the full set of bands from step 610 or step 607, in the case where one or more bands were determined to be unavailable in step 616. Operation proceeds from step 617 to step 618.

In step 618 the wireless terminal communicates device information and/or other information to a control device, e.g., to control node 110. Step 618 includes step 620. In some embodiments step 618 includes one or more of the steps 622, 624, 626 and 628. Steps 622, 624, 626 and 628 are optional steps and thus one of more of steps 622, 624, 626 and 628 may be performed in some embodiments while skipped in others. Although shown as different steps, it should be appreciated that in some embodiments the communicated information, corresponding to one or more of steps 620, 622, 624, 626 and/or 628, may be communicated in a single message from the wireless terminal to the control node. In step 620 the wireless terminal communicates information indicating the location of the wireless terminal and, optionally, information identifying one or more available frequency bands, to the control node, e.g., information from step 604 and, optionally, information from step 617. In step 622, information indicating an amount of interference sensed for one of the frequency bands under consideration for use by the wireless terminal is communicated to the control node, e.g., information from step 614. In some embodiments, the control node, e.g. control node 110, manages database 120, which may be database 300 of FIG. 3, and controls the storage of various sets of information received from various communications devices, e.g., wireless terminals, in the system 100. Thus the control node receives information such as the location information, sensed available frequency bands, sensed interference etc., from the wireless terminal and stores and/or updates the information in the database, e.g., database 120 of FIG. 1.

In step 624 the wireless terminal communicates information indicating the sensed fraction of time the frequency band is used at the wireless terminal location, for one or more of said frequency bands under consideration for use by the wireless terminal. Thus in step 624 the sensed frequency band usage time, e.g., based on the sensing of step 614, is communicated to the control node. In some embodiments the communicated information in step 624 also indicates the fraction of time said one of said frequency bands is used at the wireless terminal locations on a per technology basis.

In step 626 the wireless terminal communicates information indicating the technologies supported by the wireless terminal to the control node. In step 628 the wireless terminal communicates information identifying peer communications devices which are of interest to the wireless terminal, to the control node. The wireless terminal may communicate, e.g., an identifier of a device of interest, an identifier of a user of interest, an application of interest and/or service of interest, to the control node. In some embodiments, at times, at least one of said one or more of said available frequency bands to be used by the wireless terminal is a frequency band that corresponds to a frequency band-technology combination used by a peer device of interest, when a peer device of interest is known to be in the vicinity of the wireless terminal location. In some embodiments the control node performs the function of a discovery server. In one example, the control node monitors the discovery signals advertised by various communications devices in the system, e.g., system 100, and notifies the wireless terminal when a device of interest is in the vicinity of the wireless terminal. Thus, the information communicated to the control node in step 628, in some embodiments, enables, the control node to match up peer devices which have a common interest which happen to be in the same local region.

Operation proceeds from step 618 to step 632 via connecting node A 630. In step 632 the wireless terminal receives information from the control device, e.g., control node. Step 632 includes step 634, and in some embodiments step 632 includes one or more of optional steps 636 and 638. Although shown as different steps, it should be appreciated that the information received in one or more of steps 634, 636 and 638 may be received in a single message in some embodiments.

In step 634 the wireless terminal receives information indicating one or more of said available frequency bands to be used by the wireless terminal. In some embodiments, the wireless terminal receives, along with the information indicating one or more of the available frequency bands to be used by the wireless terminal, an indication of the time frequency band availability remains valid. For example, the control node 110 informs the wireless terminal 102 what frequency band or bands the wireless terminal is to use for communicating with other communications peer communications devices. In some embodiments the information indicating the frequency band to be used is received, e.g., in an assignment message from the control device. In some embodiments, a received validity time indicates a period of time for which the wireless terminal may use the assigned frequency band. For example, the control node 110 accesses the FCC compliant database 122 and finds information indicating a time period for which one or more frequency bands corresponding to TV channels are being made available for use by communications devices at a location, however after the indicated time period, the frequency band may be put in use again for TV broadcast and thus may no longer remain available for use by the communications devices. Accordingly, in some embodiments the control node 110 indicates such availability time period associated with a frequency band which is assigned to the wireless terminal 102, e.g., as part of an assignment message.

In step 636 the wireless terminal receives information indicating a communications technology to be used when communicating in an individual one of said one or more of said available frequency bands to be used by the wireless terminal. The control node 110 in some embodiments evaluates which frequency band-communications technology combination would result in an acceptable, e.g., best, communications quality and/or acceptable, e.g., highest, throughput of data for the wireless terminal, and indicates the communications technology that should be used when communicating using an assigned individual frequency band from said one or more of said available frequency bands. In some embodiments, the control device may assign a wireless terminal a frequency band to use which is beneficial from an overall system perspective, but may not be optimal from the particular wireless terminal's perspective.

In step 638 the wireless terminal receives information including a list of peer communications devices of interest which are in the vicinity of the wireless terminal, and information indicating the frequency bands being used by the peer communications device of interest in said list of peer communications devices of interest. In some embodiments the information regarding the peer communications devices of interest which are in the vicinity, may be in response to a request for search and discovery of communications devices of interest, from the wireless terminal to the control node, e.g., a response to information communicated in step 628. Using the information received in step 638, the wireless terminal may, and sometimes does, choose a device of interest to communicate with. In some embodiments the received information further includes information indicating a communications technology or communications technologies being used by individual peer communications devices of interest when communicating in an indicated frequency band.

Operation proceeds from step 632 to step 640. In step 640 the wireless terminal 102, having been assigned one or more frequency bands for communications, transmits and/or receives information using the assigned frequency band and/or bands, and one or more technologies specified by the control device. For example, in step 640 the wireless terminal transmits and receives direct peer to peer signals using an assigned frequency band using a specified technology, as part of participating in a local peer to peer network.

Operation proceeds from step 640 to step 604, via connecting node B 642. In different locations and/or at different times different bands may be available and/or different technologies may be supported for peer to peer signaling. At a different location, e.g., outside its current local area, e.g., location 140, the wireless terminal repeats the method of flowchart 600. In some embodiments, the assignment of a band to use at a particular location is valid for a indicated time, and the wireless terminal repeats steps of flowchart 600, e.g., to continue peer to peer communications. In some embodiments, the wireless terminal indicates to the control node a preferred frequency band and/or technology that it would like to continue using.

Figure 7:
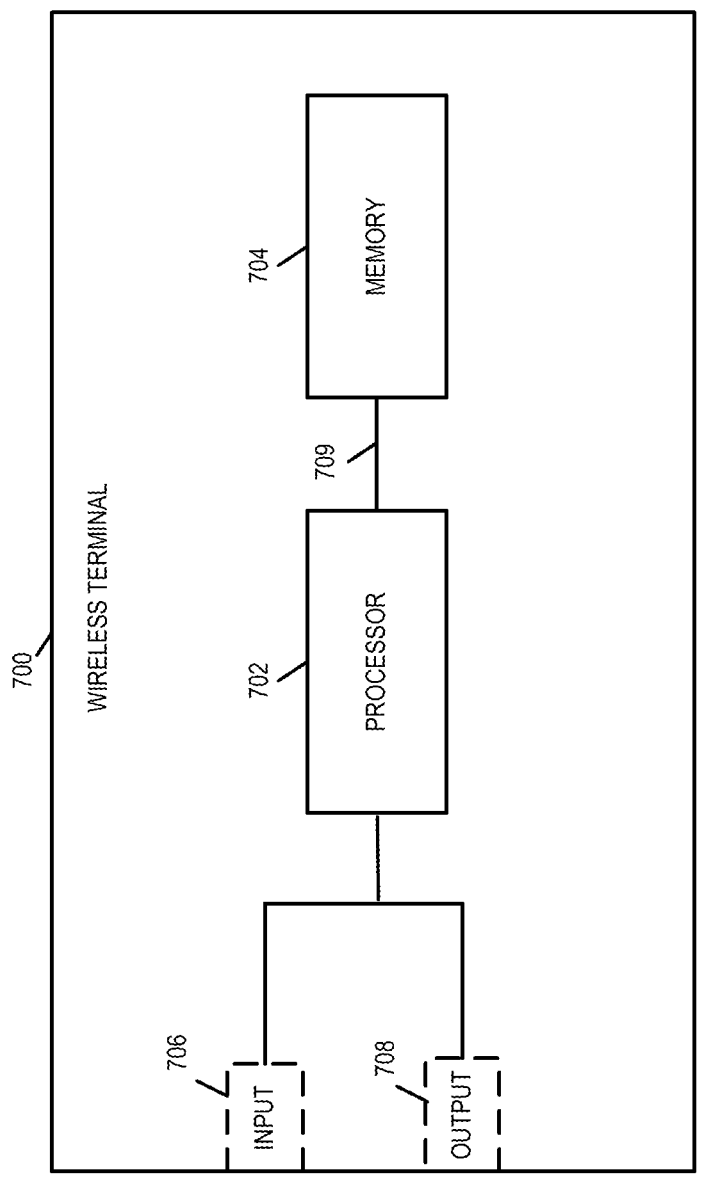
FIG. 7 illustrates an exemplary communications device, e.g., a wireless terminal, which can be used in the system of FIG. 1.

FIG. 7 illustrates an exemplary wireless terminal 700 implemented in accordance with one exemplary embodiment. Wireless terminal 700 may be, and in at least one embodiment is, a mobile wireless terminal supporting peer to peer communications and implementing a method in accordance with flowchart 600 of FIG. 6. The wireless terminal 700 may be used, e.g., the communications device 102 of FIG. 1. Wireless terminal 700 includes a processor 702 and memory 704 coupled together via a bus 709 over which the various elements (702, 704) may exchange data and information. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output signals.

Processor 702, in some embodiments, is configured to: determine the location of the wireless terminal; communicate information indicating the location of a wireless terminal to a control device, e.g., control node 110; and receive information indicating one or more of said available frequency bands to be used by said wireless terminal. In some such embodiments, processor 702 is further configured to: perform a sensing operation to detect signals in one or more frequency bands under consideration for use by the wireless terminal and to communicate information identifying one or more available frequency bands, as part of being configured to communicate to a control device. The processor 702, in some embodiments, is further configured to perform sensing, for at least one of one or more frequency bands under consideration for use by the wireless terminal, for at least one of: i) interference at the wireless terminal location and ii) a fraction of time said at least one frequency band is used at the wireless terminal location, as part of being configured to perform a sensing operation.

Processor 702, in some embodiments, is further configured to communicate information indicating an amount of interference sensed, for one of said frequency bands under consideration for use by the wireless terminal 700, to the control device. In some embodiments the processor 702 is further configured to communicate information indicating the sensed fraction of time the frequency band is used at the wireless terminal location, for one of said frequency bands under consideration for use by the wireless terminal, to said control device. In some embodiments the communicated information indicates the fraction of time said one of said frequency bands is used at the wireless terminal location on a per technology basis.

In some embodiments the processor 702 is further configured to communicate information to the control device indicating the technologies supported by the wireless terminal. Processor 702, in some embodiments is further configured to receive information indicating a communications technology to be used when communicating in an individual one of said one or more of said available frequency bands to be used by said wireless terminal. The processor 702 in some embodiments is further configured to communicate information to the control device identifying peer communications devices of interest. In some embodiments at least one of said one or more of said available frequency bands to be used by the wireless terminal 700 is a frequency band that corresponds to a frequency band-technology combination used by a peer device of interest, when a peer device of interest is known to be in the vicinity of the wireless terminal location.

Processor 702 is further configured to communicate information to the control device identifying peer communications devices of interest; and receive information including a list of peer communications devices of interest which are in the vicinity of the wireless terminal and information indicating frequency bands being used by the peer communications devices in said list of peer communications devices of interest. In some embodiments the received information further includes information indicating a communications technology or communications technologies being used by individual peer communications devices of interest when communicating in an indicated frequency band. Various sets of received information, e.g., received information from the control device 110, may be stored in the memory 704.

Figures 8, 8A:
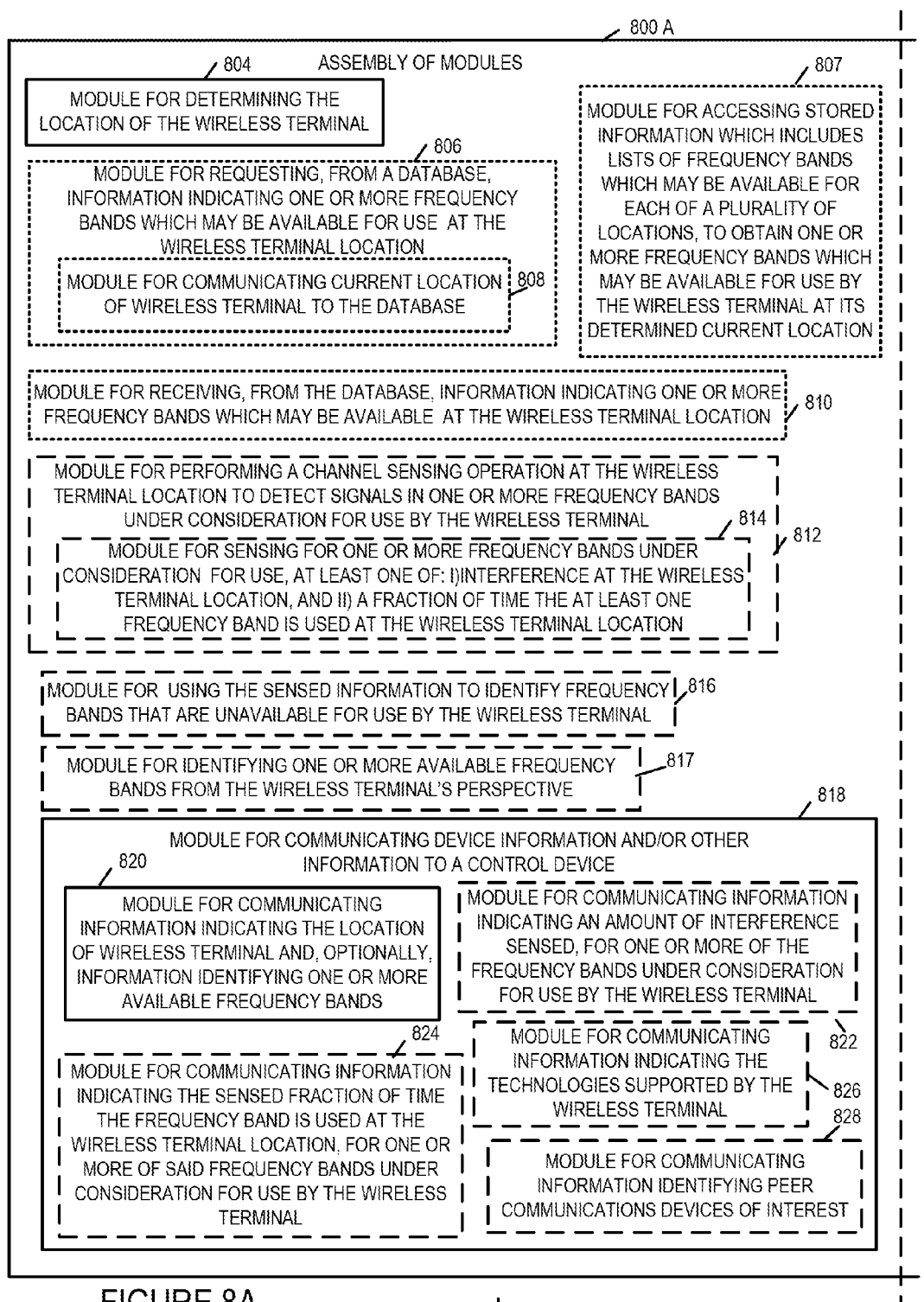
FIG. 8A illustrates a first portion of an assembly of modules which can be used in the exemplary communications device of FIG. 7.
Figure 8B:
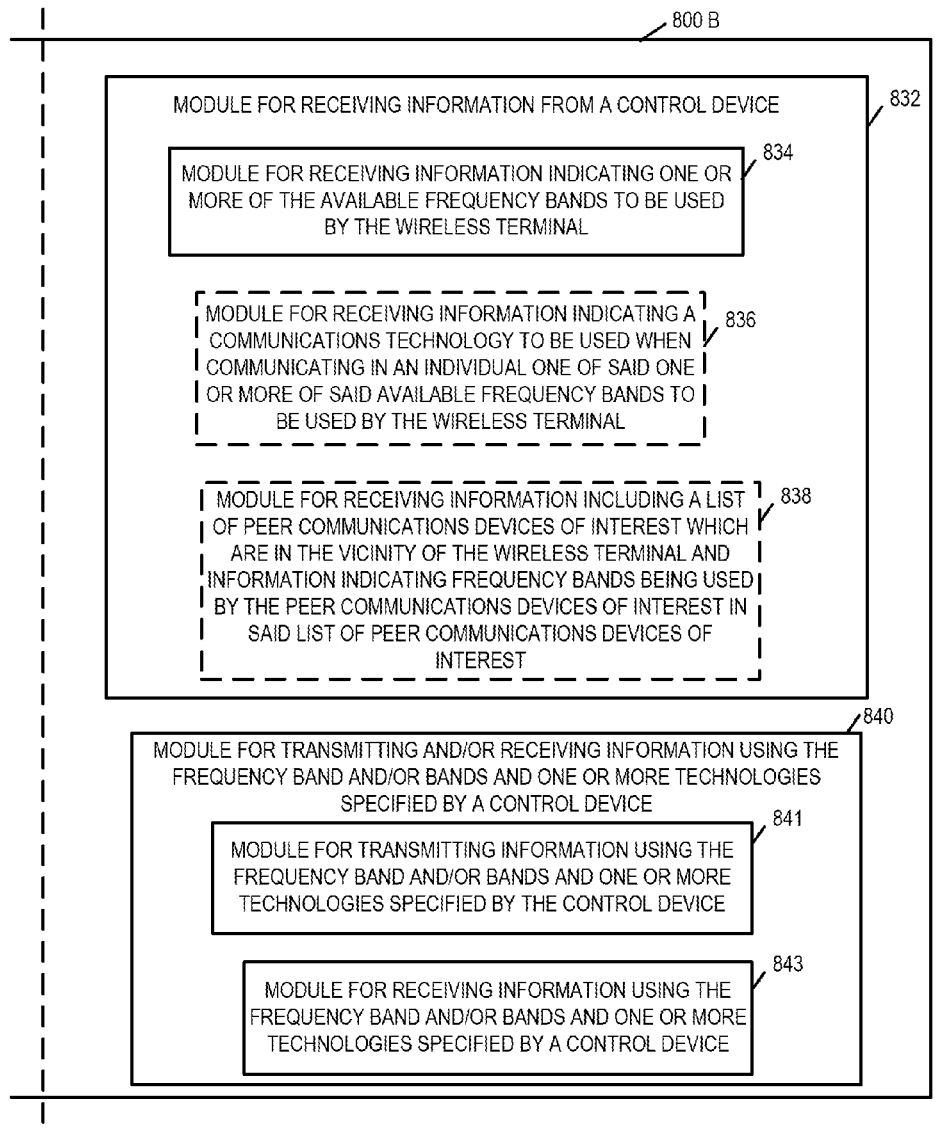
FIG. 8B illustrates a second portion of an assembly of modules which can be used in the exemplary communications device of FIG. 7.

FIG. 8, comprising the combination of FIG. 8A and FIG. 8B is an assembly of modules 800 which can, and in some embodiments is, used in the wireless terminal 700 illustrated in FIG. 7. Assembly of modules 800 includes portion 800a and portion 800b. The modules in the assembly 800 can be implemented in hardware within the processor 702 of FIG. 7, e.g., as individual circuits. Alternatively, the modules may be implemented in software and stored in the memory 704 of the wireless terminal 700 shown in FIG. 7. While shown in the FIG. 7 embodiment as a single processor, e.g., computer, it should be appreciated that the processor 702 may be implemented as one or more processors, e.g., computers. When implemented in software the modules include code, which when executed by the processor, configure the processor, e.g., computer, 702 to implement the function corresponding to the module. In some embodiments, processor 702 is configured to implement each of the modules of the assembly of modules 800. In embodiments where the assembly of modules 800 is stored in the memory 704, the memory 704 is a computer program product comprising a computer readable medium comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the wireless terminal 700 or elements therein such as the processor 702, to perform the functions of the corresponding steps illustrated and/or described in the method of flowchart 600 of FIG. 6.

The assembly of modules 800 includes a module corresponding to each step of the method of flowchart 600 shown in FIG. 6. The module in FIG. 8 which performs or controls the processor 702 to perform a corresponding step shown in flowchart 600 is identified with a number beginning with an 8 instead of beginning with 6. Assembly of modules 800 includes a module 804 for determining the location of the wireless terminal, a module 806 for requesting, from a database, information indicating one or more frequency bands which may be available at the wireless terminal location, a module 807 for accessing stored information which includes lists of frequency bands which may be available for each of a plurality of locations, to obtain one or more frequency bands which may be available for use by the wireless terminal at its determined current location, and a module 810 for receiving, from the database, information indicating one or more frequency bands which may be available for use at the wireless terminal location. In some embodiments the module 806 includes a module 808 for communicating the current location of the wireless terminal to the database.

The assembly of modules further includes a module 812 for performing a channel sensing operation at the wireless terminal location to detect signals in one or more frequency bands under consideration for use by the wireless terminal, a module 816 for using the sensed information to identify frequency bands that are unavailable for use by the wireless terminal, a module 817 for identifying one or more available frequency bands from the wireless terminal's perspective, and a module 818 for communicating device information and/or other information to a control device. In some embodiments the module for performing a channel sensing operation 812 includes a module 814 for sensing for one or more frequency bands under consideration for use, at least one of i)

interference at the wireless terminal location and ii) a fraction of time the at least one frequency band is used at the wireless terminal location.

Module 818 for communicating device information and/or other information to a control device includes a module 820 for communicating information indicating the location of wireless terminal and, optionally, information identifying one or more available frequency bands. In some embodiments, module 818 includes one or more of: a module 822 for communicating information indicating an amount of interference sensed, for one or more of the frequency bands under consideration for use by the wireless terminal, a module 824 for communicating information indicating the sensed fraction of time the frequency band is used at the wireless terminal location, for one or more of said frequency bands under consideration for use by the wireless terminal, a module 826 for communicating information indicating the technologies supported by the wireless terminal, and a module 828 for communicating information identifying peer communications devices of interest.

In some embodiments, module 824 communicates information indicating the fraction of time one of said frequency bands is used at the wireless terminal location on a per technology basis. In some embodiments, at times, at least one of said one or more available frequency bands to be used by said wireless terminal is a frequency band that corresponds to a frequency band-technology combination used by a peer device of interest when a peer device of interest is known to be in the vicinity of the wireless terminal location.

The assembly of modules 800 further includes a module 832 for receiving information from a control device, and a module 840 for transmitting and/or receiving information using the frequency band and/or bands and one or more of the technologies specified by a control device. Module 832 for receiving information from a control device includes a module 834 for receiving information indicating one or more of the available frequency bands to be used by the wireless terminal. In some embodiments, module 834 is also for receiving information indicating the time frequency band availability remains valid, for one or more frequency bands, along with receiving information indicating the one or more available frequency bands to be used.

In various embodiments, module 832 for receiving information from a control device includes one or more of: a module 836 for receiving information indicating a communications technology to be used when communicating in an individual one of said one or more of said available frequency bands to be used by the wireless terminal and a module 838 for receiving information including a list of peer communications devices of interest which are in the vicinity of the wireless terminal and information indicating the frequency bands being used by the peer communications devices of interest in said list of peer communications devices of interest. In some embodiments the received information further includes information indicating communications technology or communications technologies being used by individual peer devices of interest when communicating in an indicated frequency band.

Module 840 includes a module 841 for transmitting information, e.g., to other peer to peer devices, using the frequency band and/or bands and one or more technologies specified by the control device, and a module 843 for receiving information, e.g., from other peer to peer devices, using the frequency band and/or bands and one or more technologies specified by the control device.

Figure 9:
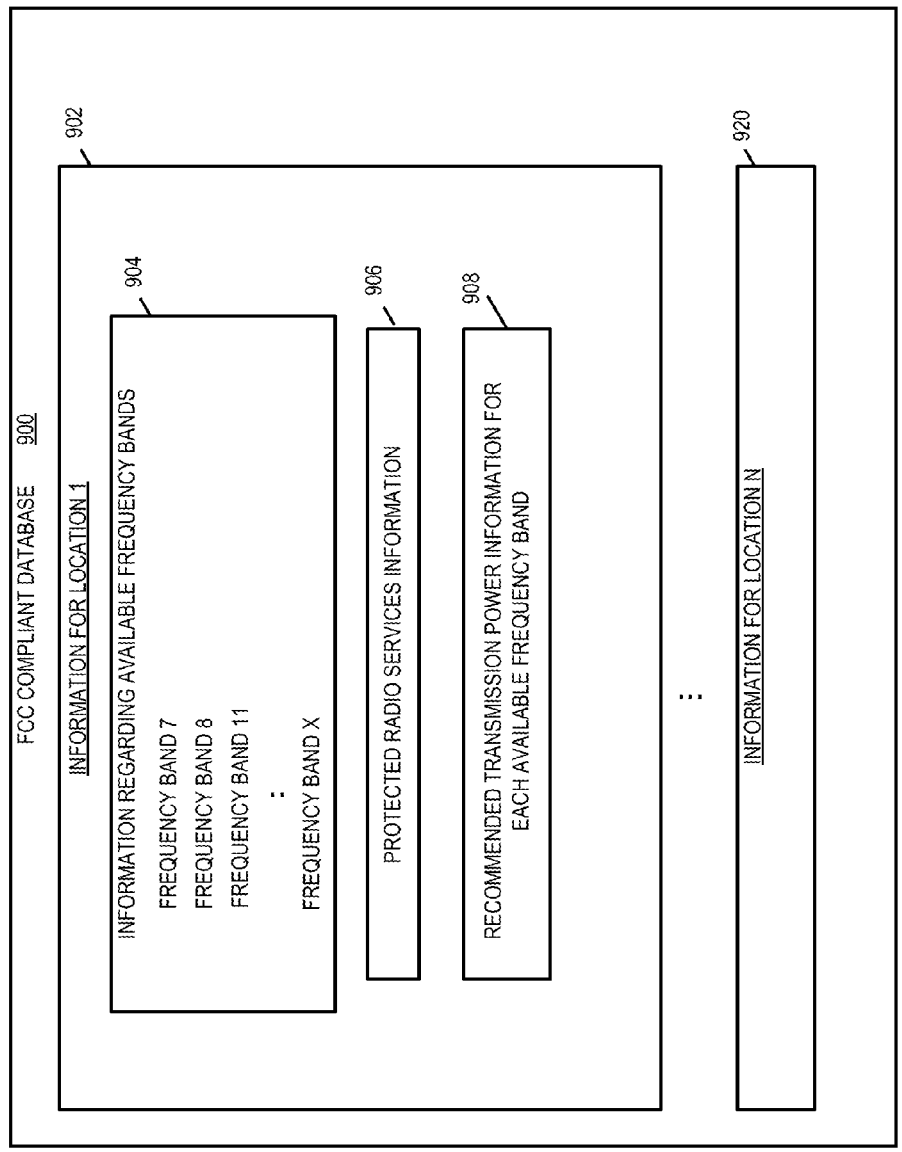
FIG. 9 illustrates an exemplary FCC compliant database, which may be used in the system of FIG. 1, in accordance with an exemplary embodiment.

FIG. 9 illustrates an exemplary FCC compliant database 900, in accordance with one embodiment. The FCC compliant database 900 can be used as the database 122 shown in the system of FIG. 1. Various communications devices may access the database 900, e.g., through an access point, and/or through the Internet. In accordance with one aspect of some embodiments, a communications device, e.g., wireless terminal that intends to use a frequency band, e.g., intends to use a frequency band corresponding to unused TV channels at a particular location for peer to peer signaling, will first access the FCC database 900 to obtain information on the frequency bands which may be available at the wireless terminal's location.

The FCC database 900 includes a plurality of sets of information for each of a plurality of different locations. In the FIG. 9 embodiment, FCC database 900 includes information for N different locations (information set for location 1 902, ..., information set for location N 920). Each information set corresponding to a location further includes a plurality of sets of information. Information set for location 1 902 includes information regarding available frequency bands at location 1 904, protected radio services information 906, and recommended transmission power information for each available frequency band 908. Various sets of information corresponding to information set 902 are discussed and it is understood that similar information for each of the other locations may be available.

Information regarding available frequency bands 904 includes list of frequency bands corresponding to unused TV channels which may be available for use at location 1 at the given time. As an example, the information set 904 shows a list of frequency bands including frequency band 7, band 8, band 11, ..., frequency band X. In some embodiments the information set 904 includes an indication of availability time period for each of the available frequency bands.

Protected radio services information 906 includes information regarding, e.g., protected services at location 1. This includes information regarding frequency bands used for TV broadcast, information on Broadcast Auxiliary Service (BAS) facilities which use vacant television channels for fixed point-to-point links. In some embodiments the database may include: (1) transmitter coordinates, e.g., latitude and longitude of the transmitter, (2) receiver coordinates, e.g., latitude and longitude or the receiver, (3) channel number, and (4) call sign information.

Recommended transmission power information 908 includes information regarding FCC recommended transmission power levels that may be used for transmitting signals in each of the available frequency bands at the given location. In various embodiments steps may be taken to curb interference that may be caused to subscriber TV receivers due to wireless communications in the available frequency band corresponding to unused TV channels. Recommended transmission power information 908 provides information on the transmission power constraints, to the communications devices which seek to use the available frequency bands at a given location.

Various aspects and/or features used in some, but not necessarily all, embodiments will be described. In accordance with some embodiment a centralized control device e.g., such as control node and a database are used to coordinate usage of frequency bands corresponding to white space. In various embodiments, operations are performed in accordance with the FCC regulations which indicate that communications devices consult a database to determine usability of one or more channels at a certain location. In accordance with one aspect, the control device is used in managing the interference on the white space.

Among other things, some of the functions that may be, and sometimes are, performed by the central control device, in accordance with some embodiments, include:
1. Help devices find other devices of interest that are geographically close by, and find out the technology and channel that they are using.
2. Do a load balancing of various technologies across different available frequency bands based on a fairness criterion.
3. Do a load balancing of various devices using the same technology across available frequency bands.

In accordance with some embodiment, each device, e.g., wireless terminal, that intends to use white space, reports to the control device, various information including, for example:
1. Location.
2. Technology (e.g. WiFi, 3G).
3. Other information such as, e.g., available channels, interference environment sensed, etc.

The control device, in at least some embodiments, uses the information received from various devices and the information in the database to perform a geographical load balancing of various technologies, and reports back to the device, e.g. reports back information to the wireless terminal. Various information, that in some embodiments is sent from the control device to the wireless terminal includes, e.g., (i) preferred frequency bands available for the technology in use, (ii) preferred frequency band to be used by the device, and/or (iii) close by devices of interest and their preferred frequency bands. The control device in at least some embodiments uses the information received from various devices, e.g., wireless terminals, and the information in the database to determine which band or bands a particular wireless terminal should use for communications, e.g., for peer to peer communications as part of a local peer to peer network.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods discussed above.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links. In some embodiments the gateway devices are implemented as access points which establish communications links with mobile nodes using OFDM and/or CDMA and/or may provide connectivity to the Internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of allocating a frequency band for wireless communication, the method comprising:
   receiving input including information indicating a location of a wireless terminal;
   accessing information from a database including channel information on a per frequency band and location basis, the accessed information including, for at least one frequency band, device number information on a per technology basis for each of a plurality of different individual technologies, device number information for an individual technology indicating the number of devices using said individual technology in said at least one frequency band; and
   assigning one of one or more available frequency bands to said wireless terminal based on said accessed database information.

2. The method of claim 1, wherein assigning one of said one or more available frequency bands includes:
   generating a band-technology performance metric as a function of said accessed database information for each of a plurality of communications technologies which can be supported by said wireless terminal, multiple band-technology performance metrics being generated for at least one frequency band, each of said multiple-technology performance metrics corresponding to a different technology.

3. The method of claim 1, further comprising:
   receiving information, from the wireless terminal, prior to said assigning, indicating the technologies supported by said wireless terminal.

4. The method of claim 2, wherein assigning one of said one or more available frequency bands further includes:
   assigning the frequency band having the highest determined band-technology performance metric.

5. The method of claim 4, wherein the accessed information further indicates a fraction of time the frequency band is used at the wireless terminal location on a per technology basis.

6. The method of claim 4, further comprising:
   communicating to the wireless terminal a communications technology to be used when communicating in the assigned frequency band.

7. A control device, comprising:
   means for receiving input including information indicating a location of a wireless terminal;
   means for accessing information from a database including channel usage information on a per frequency band and location basis, the accessed information including, for at least one frequency band, device number information on a per technology basis for each of a plurality of different individual technologies, device number information for an individual technology indicating the number of devices using said individual technology in said at least one frequency band; and
   means for assigning one of one or more available frequency bands to said wireless terminal based on said accessed database information.

8. The control device of claim 7, wherein said means for assigning one of said one or more available frequency bands include means for generating a band-technology performance metric as a function of said accessed database information for each of a plurality of communications technologies which can be supported by said wireless terminal, said means for generating a band-technology performance metric generating multiple band-technology performance metrics for at least one frequency band, each of said multiple-technology performance metrics corresponding to a different technology.

9. The control device of claim 7, further comprising:
   means for receiving information, from the wireless terminal, indicating the technologies supported by said wireless terminal.

10. The control device of claim 8, wherein said means for assigning one of said one or more available frequency bands further include means for assigning the frequency band having the highest determined band-technology performance metric.

11. A computer program product, for use in a control device, comprising:
    a non-transitory computer readable medium comprising:
        code for causing at least one computer to receive input including information indicating a location of a wireless terminal;
        code for causing said least one computer to access information from a database including channel usage information on a per frequency band and location basis, the accessed information including, for at least one frequency band, device number information on a per technology basis for each of a plurality of different individual technologies, device number information for an individual technology indicating the number of devices using said individual technology in said at least one frequency band; and
        code for causing said least one computer to assign one of one or more available frequency bands to said wireless terminal based on said accessed database information.

12. A control device, comprising:
    at least one processor configured to:
        receive input including information indicating a location of a wireless terminal;
        access information from a database including channel usage information on a per frequency band and location basis, the accessed information including, for at least one frequency band, device number information on a per technology basis for each of a plurality of different individual technologies, device number information for an individual technology indicating the number of devices using said individual technology in said at least one frequency band; and
        assign one of one or more available frequency bands to said wireless terminal based on said accessed database information; and
    a memory coupled to said at least one processor.

13. The control device of claim 12, wherein said at least one processor is further configured to generate a band-technology performance metric as a function of said accessed database information for each of a plurality of communications technologies which can be supported by said wireless terminal in a frequency band.

14. The control device of claim 12, wherein said at least one processor is further configured to receive, from the wireless terminal, information indicating the technologies supported by said wireless terminal.

15. The control device of claim 13, wherein said at least one processor is further configured to assign the frequency band having the highest determined band-technology performance metric, as part of being configured to assign one of one or more available frequency bands to said wireless.

16. A method of operating a wireless terminal, comprising:
determining the location of the wireless terminal;
communicating information indicating the location of said wireless terminal to a control device; and
receiving information indicating an available frequency band assigned for use to said wireless terminal by said control device and information indicating a technology to be used in said assigned frequency band, said assignment being based on accessed information from a database, the accessed information including, for at least one frequency band, device number information on a per technology basis for each of a plurality of different individual technologies, device number information for an individual technology indicating the number of devices using said individual technology in said at least one frequency band.

17. The method of claim 16,
wherein said communicating includes communicating information indicating the technologies supported by said wireless terminal to said control device.

18. The method of claim 17, further comprising performing a sensing operation including:
sensing, for at least one of one or more frequency bands under consideration for use by the wireless terminal, a fraction of time said at least one of one or more frequency bands is used at the wireless terminal location.

19. The method of claim 16, further comprising:
communicating information identifying peer communications devices of interest to said control device.

20. The method of claim 18, further comprising:
communicating information indicating the sensed fraction of time the at least one of one or more frequency bands under consideration for use by the wireless terminal is used at the wireless terminal location, to said control device.

21. The method of claim 19, wherein said available frequency band assigned for use to said wireless terminal is a frequency band that corresponds to a frequency band-technology combination used by a peer device of interest when a peer device of interest is known to be in the vicinity of the wireless terminal location.

22. A wireless terminal, comprising:
means for determining the location of the wireless terminal;
means for communicating information indicating the location of said wireless terminal to a control device; and
means for receiving information indicating an available frequency band assigned for use to said wireless terminal by said control device and information indicating a technology to be used in said assigned frequency band, said assignment being based on accessed information from a database, the accessed information including, for at least one frequency band, device number information on a per technology basis for each of a plurality of different individual technologies, device number information for an individual technology indicating the number of devices using said individual technology in said at least one frequency band.

23. The wireless terminal of claim 22, further comprising:
means for communicating information indicating the technologies supported by said wireless terminal to said control device.

24. The wireless terminal of claim 23, further comprising:
means for sensing, for at least one of one or more frequency bands under consideration for use by the wireless terminal, a fraction of time said at least one of one or more frequency bands is used at the wireless terminal location.

25. The wireless terminal of claim 22, further comprising:
means for communicating information identifying peer communications devices of interest to said control device.

26. A computer program product, for use in a wireless terminal, comprising:
a non-transitory computer readable medium comprising:
code for causing at least one computer to determine the location of the wireless terminal;
code for causing said least one computer to communicate information indicating the location of said wireless terminal to a control device; and
code for causing said least one computer to receive information indicating an available frequency band assigned for use to said wireless terminal by said control device and information indicating a technology to be used in said assigned frequency band, said assignment being based on accessed information from a database, the accessed information including, for at least one frequency band, device number information on a per technology basis for each of a plurality of different individual technologies, device number information for an individual technology indicating the number of devices using said individual technology in said at least one frequency band.

27. A wireless terminal, comprising:
at least one processor configured to:
determine the location of the wireless terminal;
communicate information indicating the location of said wireless terminal to a control device; and
receive information indicating an available frequency band assigned for use to said wireless terminal by said control device and information indicating a technology to be used in said assigned frequency band, said assignment being based on accessed information from a database, the accessed information including, for at least one frequency band, device number information on a per technology basis for each of a plurality of different individual technologies, device number information for an individual technology indicating the number of devices using said individual technology in said at least one frequency band; and
a memory coupled to said at least one processor.

28. The wireless terminal of claim 27, wherein said at least one processor is further configured to:
communicate information indicating the technologies supported by said wireless terminal to said control device.

29. The wireless terminal of claim 28, wherein said at least one processor is further configured to:
sense, for at least one of one or more frequency bands under consideration for use by the wireless terminal, a fraction of time said at least one of one or more frequency bands is used at the wireless terminal location, as part of being configured to perform a sensing operation.

30. The wireless terminal of claim 27, wherein said at least one processor is further configured to:
communicate information identifying peer communications devices of interest to said control device; and
wherein said available frequency band assigned for use to said wireless terminal is a frequency band that corresponds to a frequency band-technology combination used by a peer device of interest when a peer device of interest is known to be in the vicinity of the wireless terminal location.

31. The method of claim 2, wherein said plurality of communications technologies which can be supported by said wireless terminal include at least two technologies from the group of technologies consisting of CDMA, GSM, Bluetooth, and WiFi.

32. The method of claim 1, further comprising:
receiving information from the wireless terminal identifying peer communications devices of interest; and
communicating, to said wireless terminal, information including a list of peer communications devices of interest which are in the vicinity of said wireless terminal and indicating frequency bands being used by the peer communications devices in said list of peer communications devices of interest.

33. The method of claim 32, wherein communicating information to said wireless terminal further includes communicating which communications technology is being used by an individual peer communications device of interest when communicating in an indicated frequency band.

* * * * *